Patented Mar. 3, 1936

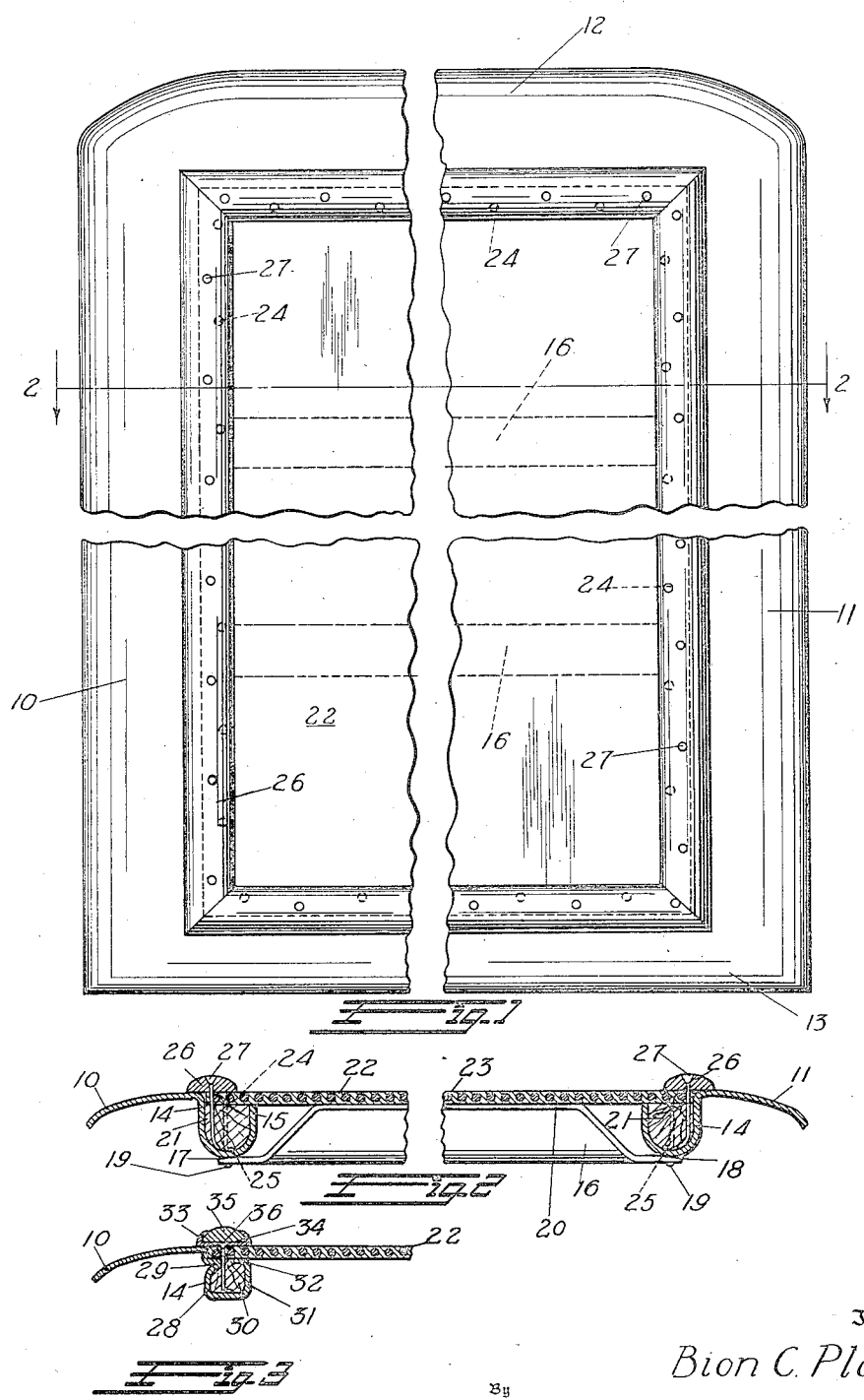

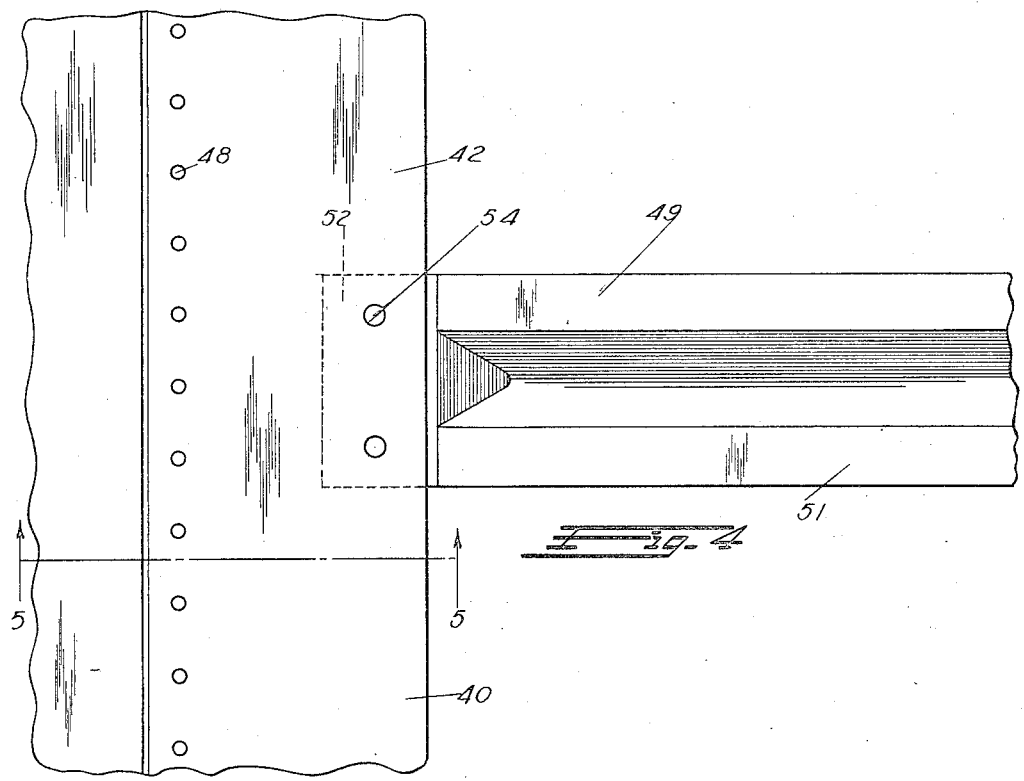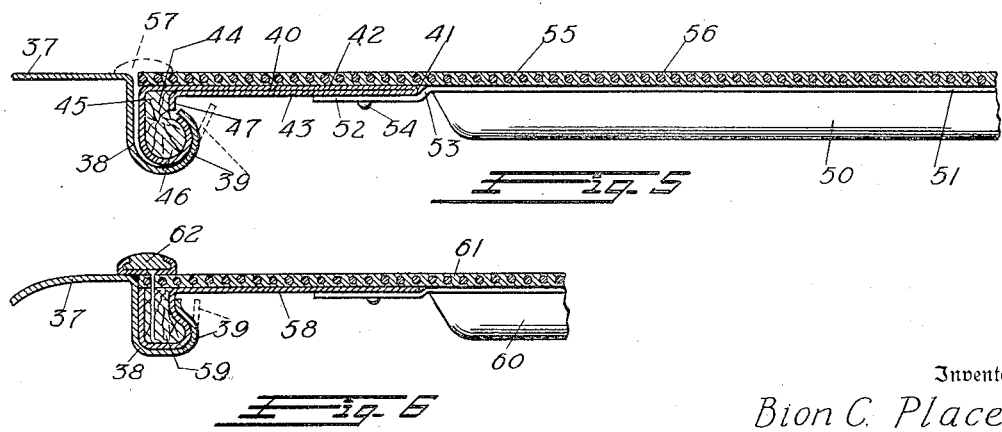

2,032,714

UNITED STATES PATENT OFFICE 2,032,714

AUTOMOBILE OR SIMILAR ROOF CONSTRUCTION

Bion C. Place, Detroit, Mich., assignor of one-half to George E. Gagnier, Detroit, Mich.

Application April 28, 1932, Serial No. 608,069

2 Claims. (Cl. 296—137)

This invention relates to an automobile or similar roof construction intended particularly for application to metallic bodies.

More particularly the invention relates to an automobile, or similar roof construction, in which substantially the entire roof consists of a relatively rigid fibrous panel capable of being secured into position, and to means whereby such unitary panel may be conveniently and expeditiously secured to a metallic body.

Automobile roofs, as generally constructed and applied to metal, composite or wooden bodies, consist of a relatively complicated supporting structure, and a multiplicity of layers of roofing material in the association and assembly of which many operations are required.

The primary purpose of the present invention is to simplify the construction of automobile and similar roofs, particularly for metallic bodies, by forming the roof from a simple metallic framework, part of which is formed by a suitable shaping of the edges of the sheet metal body that define the roof opening and a unitary panel that closes said opening.

Another object of the invention is to provide a simple arrangement whereby a unitary panel is constructed so as to be stiff enough to be self-supporting and require only a minimum number of supporting elements, which panel may be attached to the metallic body by nailing the unitary structure to the supporting structure.

Another object of the invention resides in the provision of an arrangement that will enable a roof panel to be nailed to strips, that are interlocked by shaping a portion of the metallic body construction, which defines the roof opening, so as to bring this about.

Another object of the invention is to provide an automobile roof panel of unitary construction designed to form substantially the entire roof of the body, which consists of an open metallic framework provided with an insert that makes it possible to tack or nail a unitary cover of a fibrous character to the framework to complete a light, durable and inexpensive roof panel comprising substantially the whole roof.

A further object of the invention is to provide an automobile roof in which the cover for the roof consists of a single layer of fibrous materials reinforced with a reticulated steel reinforcement adding great strength to the panel and particularly reinforcing the edges through which nails or tacks used in applying the cover pass.

Still another object of the invention consists in the provision of nail receiving strips secured in nested relation within a portion of the metallic frame surrounding the roof opening, which frame is formed to permit such nesting.

Still another object of the invention is to provide a nailing strip consisting of paper, preferably twisted, compacted and permeated with an initially liquid cementitious substance capable of holding any nails or tacks driven thereinto with great tenacity.

A still further object of the invention is to provide a frame for a unitary roof panel that is intended to be associated with a body provided with an upwardly opening channel designed to receive the frame of the panel, which frame includes a nailing strip that is covered in whole or in part by the sheet metal of which the frame of the panel is constructed.

Further objects of the invention will appear as a description thereof proceeds with reference to the accompanying drawings in which:

Figure 1 is a plan view of an automobile roof constructed in accordance with one embodiment of the invention, intermediate parts of the roof being broken away.

Figure 2 is a transverse sectional view taken on the plane indicated by the line 2—2, looking in the direction of the arrows.

Figure 3 is a side transverse sectional view showing a modified form of the invention illustrated in Figures 1 and 2.

Figure 4 is a fragmentary plan view showing a portion of the frame surrounding a roof panel opening and a fragment of the frame of a panel designed to close said opening, the cover for the panel being omitted.

Figure 5 is a transverse sectional view of the arrangement of Figure 4, the cover and molding for the roof panel being shown.

Figure 6 is a transverse sectional view similar to Figure 5 showing a modified form of the invention shown in the latter figure.

Like reference characters indicate like parts throughout the several views.

Referring first to the embodiment of the invention as shown in Figures 1 and 2 of the drawings, 10 and 11 designate metallic portions of the sides of the body that are continued around the upper corners of the body following known practices, while 12 represents a portion of the metal end for the rear of the body, which is likewise carried over a rear corner in accordance with known practices. 13 designates a metallic strip extending along the forward portion of the roof of the body, the portions 10, 11 and 12 and the strip 13 define a roof opening between them consisting substantially of the entire roof of the body and said portions and strip are provided with an upwardly opening channel 14, preferably by forming the edges thereof into said form. The inner wall 15 of the channel, preferably, is shorter than the outer wall thereof for a purpose presently to be described. A construction is thus provided including a roof opening that is surrounded by a continuous channel extending along every side and end thereof. Preferably braces of suitable form 16 are disposed at intervals along the length of the roof opening, said braces extending transversely of the roof opening.

The braces 16 may be made in any desired form, but preferably they are flanged channel bars in transverse section between the ends, the flanges and channels gradually merging towards the ends of the braces into flat portions 17 and 18 that are riveted or otherwise suitably secured to the bottom of the channels 14 as indicated at 19. The flanges 20 of the braces 16 are arranged so that the tops thereof are in alignment with the top edges of the wall 15 of the channel 14.

The roof opening thus provided is closed by a unitary panel, which for convenience in application it is desired to nail to the frame surrounding the roof opening and consisting of the channels 14 above described. In order that the roof panel may be nailed to a metallic structure insert strips 21 are disposed in the channels 14. Said insert strips may be formed of wood and shaped so as to relatively snugly fit in the channels 14 within which they may be secured as by cementing or gluing said strips within the channels, or if desired, the upper edge of the wall 15 may be peened over the corner of the wooden strip after the same has been applied in the channel as may be desired.

The unitary roof panel 22 is preferably constructed of fiber board, cardboard or the like having a reticulated steel reenforcement 23 inserted therein. Material suitable for the formation of such panels is fully described in Patent #1,777,521, granted July 15th, 1930. The roof cover 22 is cut to relatively snugly fit within the roof opening so that the edges thereof will substantially lap the inserts 21 in the channels 14. The cover 22 is nailed or tacked to the wooden insert by means of nails 24. Preferably nails of sufficient length are selected so that the ends thereof contact with the bottom of the channels 14 after they are driven into the wooden inserts, so that the ends of the nails are clenched against said bottoms as indicated at 25, Figure 2.

The cover 22 may, if deemed desirable, be secured in similar manner to inserts disposed in channels of the transverse members 16, or said covers may be secured to such members in any approved manner as by cementing or gluing the inner surface. The cover 22 is of extremely light weight and may be made of the order of .05 or .10 of an inch, the steel reinforcement adding sufficient strength to the fiber board so that the cover as thin as just stated may be employed. Furthermore, it will be observed that since the nailing of the cover to the insert takes place through the reticulated reinforcement that said reinforcement prevents the drawing out of the nails from the nail hole openings laterally toward the adjacent edge of the cover. The outer surface of the cover may be provided with any surfacing material, making it feasible to apply thereto the same paint or finish coating that is applied to the body to the end that the roof may be finished in the same color as the body thereof.

Preferably, a molding 26 conceals the heads of the driven fastener 24, said molding as well as the edges of the cover being tacked to the insert 21 by tacks or nails 27. The molding 26 may be constructed of any suitable fibrous or similar material.

If desired, the arrangement illustrated in Figure 3 of the drawings may be used, instead of that illustrated in Figures 1 and 2. In Figure 3 the inner wall 28 of the channel 14' formed around the roof opening is provided with a corrugation 29 presenting a shoulder on which the edge of the covering material may rest and at the same time a further shoulder that will serve to positively maintain an insert 30 within the channel. The outer wall 31 of said channel is provided with an integrally turned portion 32 presenting likewise a support on its outer surface for the cover 22 and a shoulder on its inner surface likewise serving to maintain the insert 30 within the channel. In this form of the invention the insert 30 consists of paper material suitably compacted and permeated with an initially liquid cement, such as pyroxylin cement for example. The paper may be kraft paper twisted together to form compact strands which are packed in the channel 14' and the whole saturated with the pyroxylin cement to provide a filler in which nails or tacks may be driven and which possesses the characteristic of holding the shanks of said nails or tacks with great tenacity. The cover 22 is nailed to the insert 30 in the manner above described, the edges of said cover being supported on the upper surface of the corrugation 29 and of the inwardly turned portion 32 of the wall 31 of the channel.

In lieu of the molding 26 illustrated in Figure 2 of the drawings, a molding such as illustrated in Figure 3 may be used, which molding consists of a metallic base portion 33 formed to provide a channel 34 that receives a compacted fibrous and similar molding 35 which may be forced in the channel 34 after the metallic body 33 has been secured to the insert by means of nails or tacks 36 that pass through the cover 22 into the insert 30.

Both of the embodiments of the invention just described require only a simple change in the metal that surrounds the roof opening, that is, the portions thereof defining said opening are bent to provide a channel for the reception of a suitable insert to which a unitary light weight roof may be expeditiously attached, the whole presenting a satisfactory roof structure that may be installed rapidly and at a minimum of cost.

The mode of applying a roof to an automobile may be used in connection with a roof constructed in accordance with the disclosure of my Patent #1,842,283, granted January 19th, 1932, which discloses a roof construction in which the panel that closes the roof opening is constructed as a unit and subsequently applied to and interlocked with the frame surrounding said opening. When this form of the invention is used, the metallic portions 37 surrounding the roof opening are provided with an upwardly opening channel 38, the inner walls 39 of which are initially disposed in parallelism with the opposite wall of the channel, or so as to diverge slightly therefrom as indicated in dotted lines in Figures 5 and 6.

The unitary panel that closes the roof opening, that is subsequently interlocked with respect to the metallic portion surrounding said opening in the manner described in the patent just referred to, is constructed of a metallic frame designed so that it may be subsequently readily interlocked with said portion and including an insert in said frame so that a cover, forming a part of said panel, can be nailed or tacked to the metallic frame thereof. As illustrated in Figures 4 and 5 of the drawings, the metallic frame for the panel consists of side and end members 40 connected together in any suitable way at the corners of the frame, said side and end members each constructed of sheet metal of suitable width by return bending the sheet metal blank at 41 to provide a cover supporting surface 42 and a strengthening or reinforcing portion 43 disposed in parallelism and preferably in contact with the under surface of said supporting flange. The ends of the portions 42 and 43 are used to substantially cover a nailing strip 44, which may be formed of wood, so as to provide a nail receiving portion 45 and a bead 46. The edge of the portion 42 of the metal flange is bent around the top, one side and substantially encircles the bead 46 while the edge of the portion 43 is bent at right angles as shown at 47, covering the portion of the insert above the bead 46. The portion 42 of the side and end members of the frame of the panel are provided with suitably spaced perforations 48 through which fasteners such as nails or tacks may be driven into the insert 44.

The side members of the frame of the panel may be connected together by transverse members 49, provided with a channel 50 formed between relatively wide flanges 51, the upper surface of which is arranged in the same plane as the upper surface of the portion 42 of the side frame member. At the ends of said transverse members 49 the channel 50 is gradually merged into a flat attaching flange 52 that is offset at 53 and attached as by rivets 54 to the under surface of the portion 43 of the side frame member.

Prior to the application of the panel to the roof opening, the frame just described is completely covered by a unitary sheet of fibrous material 55 preferably strengthened by a reticulated wire fabric 56, said cover 55 being secured to the wooden inserts 45 by means of nails or tacks driven through the openings 48 in the portion 42 of the frame, and into the insert. Suitable nails may be selected so that the ends thereof will be clenched against the bottom of the metal channel formed by the portion of the frame that laps the bead 46 of the insert, as above described with reference to Figure 2. A suitable molding 57 may be applied to the margins of the cover 55 by nailing or tacking.

After the panel has been completely constructed as a unit, it is applied to the opening in the roof of the body by inserting the inwardly projecting frame portions thereof in the channel 38 provided in the frame 37 that surrounds said opening. The panel is then interlocked, with respect to the frame that surrounds it, by bending the side wall 39 of the channel 38 around the bead on the frame from the dotted to the full line position illustrated in Figure 5 of the drawings in accordance with the patent above referred to.

Instead of the arrangement illustrated in Figures 4 and 5 of the drawings, the side and end members of the frame of the panel may be constructed as illustrated in Figure 6. In this form of the invention the side and end members of the frame of the panel are constructed from a strip of sheet metal 58 bent to provide a horizontal supporting flange for the cover for the panel, the opposite ends of said strip being bent around an insert 59 as illustrated in Figure 6 of the drawings. The insert 59 may be of wood or any other material, such as the compacted and twisted paper permeated with cement above referred to. The side members of the frame of the channel may be connected by a transverse member 60 similar to the transverse members 49 of Figure 4. The covering for the panel is preferably a sheet of material of the kind previously described, which covering 61 is applied to the frame of the panel by nailing or tacking the margins thereof to the insert strip 59 forming a part of the side and end members of the frame of said panel. Suitable molding 62 of an approved form is likewise preferably attached to the panel prior to the application of the panel to the openings in the roof. The moldings 62 may assume a form similar to that above described with reference to Figure 3 of the drawings or of any other form. Preferably the molding is applied so that about two-thirds of the width laps the panels so that said molding will be conveniently secured to the inserts to which the cover for the panels are secured as just described.

After the panel has been completely constructed it is assembled with respect to the body by inserting it in the opening in the roof and disposing the metal covered inserts 59 in the channel 38. An interlock is then brought about between the panel and the metallic frame surrounding the roof by bending the wall 39 of the channel 38 from the dotted to the full line position illustrated in Figure 6, resulting in a continuous interlock between the frame of the panel and the body that is effected at all points along the length of the sides and ends of the panels.

While the above described material is preferred as the cover for the roof opening, it will be understood that any fibrous or similar material capable of being nailed or tacked may be used with equal facility and such material is contemplated as a part of the present invention. It will be observed that essentially the construction, so far as the frame of the roof is concerned, is a metal construction and that an arrangement is provided whereby a single relatively stiff panel may be rapidly applied to the metal frame of the panel, or of the roof construction resulting in a roof of an extremely simple construction of light weight and low cost. When compacted paper is utilized as the insert for the reception of the driven fasteners, it will be understood that the paper may be readily packed in the channels provided for its reception after the frame has been provided for said insert, though if wooden inserts are used, it is necessary, as a matter of course, that the frame be formed around such inserts. Paper or similar inserts that may be packed into the channel are accordingly preferred, because of the reduced cost of production. It has been found that by saturating the paper material with cement of the kind that is ordinarily used to waterproof roofing material and of the kind that is used to secure laminated paper structures together is effective to firmly hold the paper in place, and to adapt such material to receive and hold with great firmness, nails driven thereinto.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. An automobile or similar roof panel designed to be applied as a unit to an opening in a roof surrounded by an upwardly opening channel, consisting in a metal frame for said panel provided with an insert of strips of material capable of receiving driven fasteners paralleling edges of said frame, said frame being shaped complemental to and of less depth than said channel so as to fit in said channel with its upper edge below the uppermost surface of the roof, and a cover for said frame secured to said insert by fasteners driven downwardly into said strips.

2. An automobile or similar roof panel designed to be applied as a unit to an opening in a roof surrounded by an upwardly opening channel, consisting of a metallic frame formed to present a complemental upwardly opening bead fitting into said channel, a wooden insert in said bead, and a panel cover lapping said frame and secured to said insert by nails clenched by deflection against a wall forming said bead.

BION C. PLACE.